United States Patent
Krautter

(10) Patent No.: US 6,684,789 B2
(45) Date of Patent: Feb. 3, 2004

(54) METHOD AND SYSTEM FOR THE TRANSFORMATION OF DIGITAL PRINT DATA STREAMS AND CORRESPONDING PRINTER AND PRINTER SERVER

(75) Inventor: Thomas Erfinders Krautter, Stuttgart (DE)

(73) Assignee: CCP Systems AG, Stuttgart (DE)

( * ) Notice: Subject to any disclaimer, the term of this patent is extended or adjusted under 35 U.S.C. 154(b) by 0 days.

(21) Appl. No.: 10/275,784

(22) PCT Filed: May 11, 2001

(86) PCT No.: PCT/DE01/01796
§ 371 (c)(1),
(2), (4) Date: Nov. 7, 2002

(87) PCT Pub. No.: WO01/88840
PCT Pub. Date: Nov. 22, 2001

(65) Prior Publication Data
US 2003/0140809 A1 Jul. 31, 2003

(30) Foreign Application Priority Data
May 17, 2000 (DE) .......................... 100 24 177
Jan. 26, 2001 (DE) .......................... 101 03 733

(51) Int. Cl.⁷ .................................. B41F 1/54
(52) U.S. Cl. .................. 101/484; 101/486; 400/61; 400/62
(58) Field of Search .................. 101/484, 485, 101/486; 400/61, 62, 63, 76; 358/1.1, 1.9, 1.15, 1.16, 1.17, 1.18

(56) References Cited

U.S. PATENT DOCUMENTS

| 5,216,754 A | | 6/1993 | Sathi et al. |
| 5,566,278 A | * | 10/1996 | Patel et al. ............... 358/1.15 |
| 6,006,013 A | | 12/1999 | Rumph et al. |

FOREIGN PATENT DOCUMENTS

| EP | 0 109 615 B1 | 6/1994 |
| EP | 0 964 339 A2 | 12/1999 |
| EP | 1 061 456 A2 | 12/2000 |
| GB | 2 357 348 A | 6/2001 |
| WO | WO-00/17748 | 3/2000 |
| WO | WO-00/55720 | 9/2000 |

* cited by examiner

Primary Examiner—Andrew H. Hirshfeld
Assistant Examiner—Minh Chau
(74) Attorney, Agent, or Firm—Squire, Sanders & Dempsey L.L.P.

(57) ABSTRACT

A method for the transformation of digital print data streams, in which an input print data stream (2) is read in, this is analyzed by means of a parser (4) for graphically representable objects (5, 5a) and is split up into these graphically representable objects (5, 5a), and the graphically representable objects (5, 5a) are stored in a memory (6) in an object-oriented format, and the graphically representable objects (5, 5a) stored in the memory (6) in an object-oriented format are transformed into a format for the control of an output device (9), preferably a printer, and the objects thus transformed are combined into an output print data stream (10) and are output, graphically representable objects (5, 5a) being stored in the memory (6) in an object-oriented format, to which at least one stored script (5a) is assigned, which is executed in the cases defined in the script (5a).

53 Claims, 1 Drawing Sheet

Figure 1:
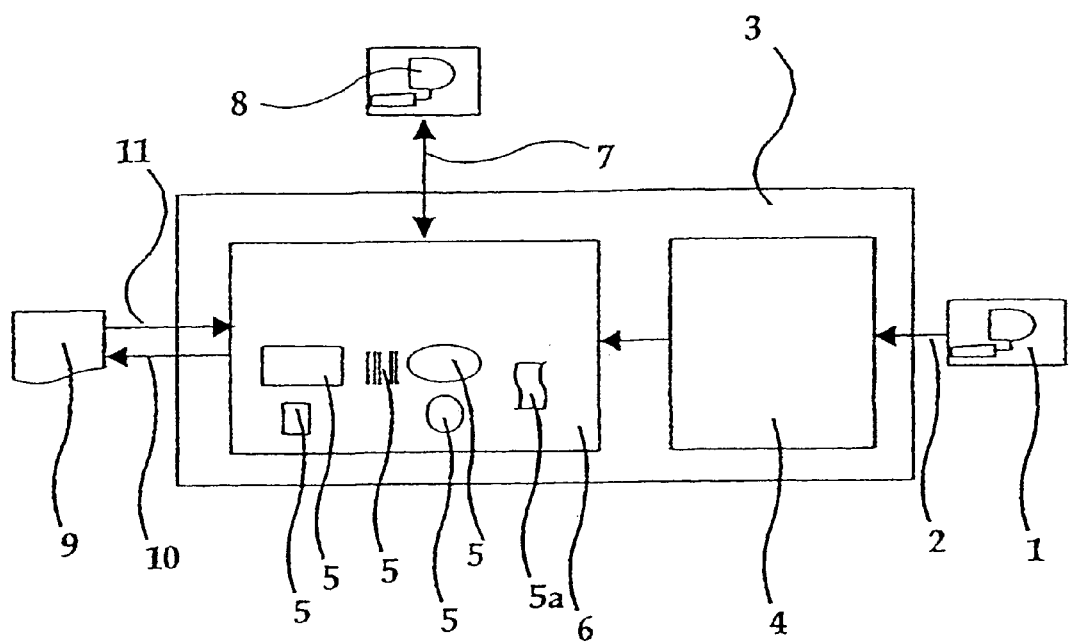

METHOD AND SYSTEM FOR THE TRANSFORMATION OF DIGITAL PRINT DATA STREAMS AND CORRESPONDING PRINTER AND PRINTER SERVER

The present invention relates to a method and system for the transformation of digital print data streams and corresponding printer and printer server.

Virtually all the output devices which are common nowadays use "page description languages", also called PDL, to produce printed documents. Here, an application program controls a driver for the output device (for example a printer driver). This driver converts information about the graphic objects to be output—for example text or image information—into the respective PDL suitable for the printer used, so that the latter can hereby be controlled directly.

More recent output devices, such as laser printers or digital color printers for example, also offer the possibility of buffering the data streams coming in to control them and, for example, using them as an original form for further incoming print data. This makes it possible to dispense with forms needed for the respective printing, such as letter paper, invoice forms or the like for example, in the individual case. Instead, the application software respectively used merely calls up the form stored once in the printer and combines it with the current print data. In this way, the accumulation of data, for example in networks, can be reduced considerably. However, the result is also organizational advantages: since the forms used no longer have to be kept in reserve by each individual user on his computer, in this way standardized use forms can be achieved, which firstly helps to ensure the often desired standard appearance of a company or an institution and secondly also makes it easier to use current form versions.

However, these aforementioned advantages are normally not used, since the printers used in a company or an institution—with regard to their control—are often not uniform and therefore the use of the functions described above is too complicated, since the appropriate forms either have to be available for each printer model used, which would be very labor-intensive, or only specific printers can be used for specific applications, which is very inflexible.

One possibility of solving this problem is to circumvent the abovedescribed inhomogeneity of the output devices used by employing methods for the conversion of various data stream formats for controlling output devices, which makes it possible for all the computers which produce print data streams to be output to use a standard format for this purpose, by each printer being assigned an interface—be it a dedicated device, be it merely in the form of a software filter—which makes use of such a method and, on the side of the input data stream, uses the format to be used uniformly and, on the side of the output data stream, uses the specific format of the printer to be controlled.

Such a solution is described, for example, by EP 0 109 615 B1, which refers to a method for the conversion of text which is represented in the form of digital data. However, the method taught by this document has considerable disadvantages with regard to the possibilities of current systems from information technology: for example, the method is suitable only for those input print data streams which, in their syntax, follow a format description language whose syntax may be described with the aid of "regular expressions". This is because the method taught in EP 0 109 615 B1 makes use of a status machine, implemented by means of "key status variables", for the recognition and conversion of input control objects recognized in the input print data stream into output control objects. These output control objects are in this case produced directly from the input control objects—specifically in accordance with a fixed assignment—as a function of the respective state representing the key status variables. Such a procedure corresponds to the functioning of the theoretical model of the Moore or Mealy machines, which operate quite efficiently but permit only, the recognition of regular expressions. For these circumstances surrounding information technology at the priority date of EP 0 109 615, such a simple possible transformation may have been sufficient, since—as can already be gathered from claim 1 there—only text had to be converted, apart from format information.

For the current circumstances of PDLs or else other input formats to be recognized where possible, such as HTML or XML, this no longer applies in any way, however. In the meantime, these have been built up in such a complex way with regard to their possibilities that a status machine is no longer in any way adequate for their recognition and conversion.

However, the target format, into which the print data stream is to be transformed, nowadays places high requirements on a transformation: although in principle there would be the possibility here likewise of using the smallest common multiple of the functions of current printing format and in this way of reducing the effort on transformation, this convenience in the design of the transformation process would be brought at great expense in the operation of the method, since in this way the accumulation of data in networks would be increased again, since powerful printer control possibilities which as a rule become more and more specific with regard to the printer type used as the complexity increases, would necessarily have to be dispensed with. Such an increased accumulation of data would, however, again stand in the way of the objective of reducing the data traffic in the network by using PDLs. Thus, at the same time, there is a requirement on the transformation process that the latter produces the preconditions that the target formats can be produced in the most flexible manner possible with all their available printing functions, in order that the traffic on the data transmission lines can thus be minimized.

Furthermore, it is necessary to state that printing systems, even today, still only fulfill a single purpose: namely printing. All the manufacturers of laser printers and digital copying systems have made great efforts in recent years to match the processor powers, storage capacities and additional options (such as memory cards, hard drives, network cards) of these systems to the increasing requirements. However, the manner in which printers and copiers are controlled and programmed has not changed significantly in the last ten years.

Printing systems are still controlled by a page description language (PDL) such as PCL, Postscript or Prescribe. It permits a document and its components to be described adequately. However, the many additional options of modern printing and copying systems available in the meantime cannot be used. The consequence of this is that, even today, the entire printing process is controlled and monitored by a host computer. Its task substantially comprises converting the respective print information exactly into the page description language "understood" by the printing system.

It is therefore an object of the present invention to specify a method for the transformation of digital print data streams which is both capable of recognizing more complex page description languages, whose syntax may no longer be described with the aid of simple regular expressions, and also provides the preconditions that the recognized graphic objects can be transformed into a target format, but also processed further, as flexibly and effectively as possible, that is to say with regard to their description at the highest possible level of abstraction.

According to the invention, this object is achieved by a method for the transformation of digital print data streams, in which an input print data stream is read in, this is analyzed by means of a parser for graphically representable objects and is split up into these graphically representable objects, and the graphically representable objects are stored in a memory in an object-oriented format, and the graphically representable objects stored in the memory in an object-oriented format are transformed into a format for the control of an output device, preferably a printer, and the objects thus transformed are combined into an output print data stream and are output, and which, according to the invention, is characterized in that graphically representable objects are stored in the memory in an object-oriented format, to which at least one stored script is assigned, which is executed in the cases defined in the script.

In this case, as opposed to the use of a status machine, the analysis and splitting of the input print data stream by a parser (syntax analyzer) ensures that the syntax of the page description language is no longer restricted to the use of regular expressions, and thus powerful page description languages can also be used. Instead, such a parser, in terms of its theoretical performance, corresponds to a Turing machine and therefore ensures the theoretically maximum achievable performance for the analysis and splitting up of formal languages.

Furthermore, storing the graphically representable objects—and therefore of course also the scripts, which themselves are certainly also graphically representable objects—in a memory in an object-oriented format achieves the situation where the objects recognized by the parser are then available in this intermediate format which is extremely beneficial for further processing.

The objects are preferably managed here by means of a "display list management", which supports one-page and multi-page documents at as many levels as desired and which can be expanded dynamically by new objects. The individual graphic objects are stored by using their membership of specific—expediently suitably hierarchically organized—classes such as relating to the class of points, ellipses, circles, lines, polygons, rectangles, squares or else to the more complex object types, such as bar codes, more complex texts or freely definable elements such as color profiles or fonts, which permits their effective conversion into an output print data stream, since, through the class of the respective object, there is already implicit information available about its possible transformation into the format of the output print data stream. For example, via an object of the type square, it is already known from the object hierarchy that this is a subclass of the rectangle. If, then, the target format for which an output print data stream is to be produced provides speech constructs relating to the description of rectangles in the page description language, then it is clear, merely on the basis of the position of the square in the object class hierarchy, that this is also a rectangle—albeit with special characteristics—and to this extent the possibilities of the target format with regard to rectangles can also be used for an object in the square class.

In addition to such implicit information—which can be derived from the object class hierarchy—about the individual objects, however, it is also possible to add to the objects explicit information about their possible conversions into specific target formats, it being advantageously possible for this also to be combined with the abovedescribed implicitly provided information, for example by a conversion method into a specific target format being added to a class which is arranged higher in the object class hierarchy, and then automatically also being available to the objects of subordinate, lower-ranking classes by way of inheritance, if a better specified method is not already assigned to said subordinate classes.

In one embodiment of the method according to the invention, the graphically representable objects are combined into super-objects of higher complexity before being stored in the memory.

The super-objects obtained in this way are then stored in the memory in the object-oriented format. In this way, less complex graphic objects can be combined to form more complex graphic super-objects. For example, sequences of lines which in each case join one another at the ends and have been recognized as graphic objects in the input print data stream can be combined to form a graphic polygon super-object. Such a combination offers various advantages, such as easier handling of the super-object stored as a whole as compared with the individual objects, since said super-object can then be treated uniformly by the methods for the super-object class with effect for all the part objects combined in it. It also helps, in certain circumstances, to further minimize the data traffic on the transmission lines used, since an object once combined is subsequently also forwarded in combined form in the output print data stream—if technically supported there—which generally requires a lower data volume to be transmitted than the transmission of the individual objects.

A preferred embodiment of the method according to the present invention is characterized in that a parser is used for the analysis and splitting up into the graphically representable objects, which, in the theoretical model, corresponds to an automatic push-down facility and which is therefore capable of analyzing and splitting up languages with "context-free grammars" particularly effectively.

A further embodiment of the method according to the present invention is characterized in that feedback messages referring to the output print data stream output are read in and are analyzed for error messages which indicate that the output device, preferably the printer, has recognized a transformed graphic object in the output print data stream which cannot be output by said printer, this graphic object is then split up into part objects of lower complexity, and the part objects thus obtained, in the format for the control of the output device, are slipped into the output print data stream which is output to the output device.

In this way, it is likewise possible to test whether the driven output device is, for example, capable of recognizing and outputting a bar-code object directly or not. If it is not capable of this and reports this back, then the bar code is simply split up into objects of the next lower hierarchy, for example filled rectangles, and a further try is made with these objects. This is continued until—if necessary until the graphic objects are split up into individual points—the output attempt is successful. The object-oriented data structure with its object hierarchy, chosen for the intermediate format, also proves to be particularly suitable for this procedure. For the further performance of the method, it is preferably noted at which level of the object classes in each case the splitting process was successful for a specific output device, in order then, in the next attempt, already to begin the output process at this level, in order also thus to avoid unnecessary data transfers, but likewise to utilize the maximum level of abstraction of the output device. In this way, the data volume to be transmitted is reduced to the necessary extent, even with high flexibility.

In an embodiment of the method according to the present invention, at least one graphically representable object stored in the memory in the object-oriented format is assigned at least one script which controls external devices, preferably archiving devices, folding systems, enveloping systems or security equipment, which permits the incorporation of all the devices needed in the widest sense for document processing.

A further preferred embodiment of the method according to the invention is characterized in that at least one graphically representable object stored in the memory in the object-oriented format is assigned at least one script which automatically receives data, preferably data organized in an object-oriented manner, image data, text data or data from web pages from the Internet, data from XML documents or else e-mails.

The script automatically receiving data can preferably also request this data automatically.

It is likewise possible that a script also sends data automatically, preferably data organized in an object-oriented manner, image data, text data or data from web pages from the Internet, data from XML documents or else e-mails, it being able in particular also to send the graphic object associated with itself to a receiver.

It can also in turn reassign the data received by it to the graphic object associated with it, and forwards the graphic object associated with itself to a receiver together with the data requested, received and reassigned by itself, or else print out said data.

In relation to the above explanations, it should be noted that the embodiments of the method according to the invention which themselves provide other objects with objects, for example by forwarding them or keeping them ready to receive or for interrogation by a script, for example, are also covered by the term "dynamic object linking" (DOL).

Systems that operate on the method according to the invention, such as printing systems, are capable of sending and receiving e-mails and of printing original print and image data without a printer driver. They are able to store any desired information on hard disks or memory cards and make said data available to all the devices connected in the network and Internet. In other words, they independently undertake demanding tasks in information processing and provision, in order to relieve host computers and personal computers of quite a lot of administrative tasks. In a heterogeneous network and printing environment with laser printing and copying systems from different manufacturers in combination with impact printers and special printing systems, they also make it possible to administer all the connected printing systems with the aid of a single standardized programming language, namely the script language, and therefore reduce the effort on administration to a minimum. At this point, it should be mentioned that these systems operating by the method according to the invention are also designated JScribe (registered trademark) systems and, accordingly, the method according to the invention is also designated JScribe (registered trademark).

When JScribe (registered trademark) is used, developers and system houses will therefore be in a position to provide objects and functions which are stored in resident form in the printing system and permit and control desired individual operating sequences. These objects and functions can use any functionality provided by the JScribe (registered trademark) basic technology, including extremely demanding commands for the job or page processing and for the complete control of the print data and emulations. The method according to the invention preferably also enables access to internal printer functions and status information (page counter, network components, file system and so on), for example via a script.

The method according to the invention is preferably characterized in that graphically representable objects are stored in the memory in an object-oriented format, to which at least one stored script is assigned, which is executed in the case of the output of the object defined in the script. In this way, for example, it is possible to execute such scripts, for example Visual Basic Scripts, Java Scripts or else "stream code" in an event-oriented manner, for example in the case where a form object is printed out, likewise "ON-PRINT" by which means, for example, to execute such functions as the printing of copies of the same form with the same net data but on different paper from different trays. In particular in interaction with those embodiments of the method according to the invention which control external devices, such as folding or enveloping machines or else stapling machines, this is particularly advantageous.

However, it may also be the case that at least one case relating to the execution of the script is defined in the respective script and occurs automatically, preferably without further influence from outside.

For example, the automatically occurring case, defined at least in the respective script, relating to the execution of the script can be configured as a timer, that is to say as a case which occurs automatically as a result of the expiry of a time, this timer preferably operating cyclically, that is to say starting itself again upon expiry.

Automatic scripts can therefore intrinsically become active and, for example, load the daily newspaper, where possible itself assembled from different sources, from the Internet, assign the found, loaded and analyzed information to a stored object and then print this object, completely without the participation of a PC or other host computer to which the printer would be connected.

For example, the simple download of JScribe (registered trademark) sequences (scripts with appropriately associated objects) can, for example, arrange for the printer automatically to fetch information about current share prices, to format it and to print it out. Image information, text documents, web pages, XML documents and any other desired print data can be analyzed while dispensing with any preparation by the PC (for example by a printer driver), modified if necessary and printed out in optimum quality. Since JScribe (registered trademark) can also be employed simultaneously as a server version for computer systems, printing systems are for the first time made capable of accessing stocks of data on host systems (for example SQL databases) interactively during the printing operation.

The language used for the scripts according to the present invention is preferably Java Script. Java Script, as a world-established standard for the script-controlled, intelligent programming of web pages, has triggered in the Internet an avalanche of innovative and functional solutions which have contributed decisively to ringing in the age of eBusiness and eCommerce. This intelligent technology, which has so decisively marked the worldwide, rapid development of the Internet, is therefore now also available for printing systems for the first time and here preferably forms the basic technology for script applications in the area of the present invention, and consequently print and document management, which is certainly uniquely and, as compared with established solutions, considerably more cost-effective.

With JScribe in conjunction with Java Script, an innovative technology is therefore provided which allows any corresponding print system operated in accordance with the method according to the invention to be programmed just as simply as an Internet homepage. The communications possibilities already described, together with the logically modular object-oriented construction of JScribe and the Java-Script-typical expansion possibilities ideally supporting JScribe permit within the shortest possible time the construction of complex output management systems for an extremely wide range of applications.

A further preferred embodiment of the method according to the present invention is characterized in that the graphically representable objects stored in the memory in an object-oriented format, preferably also script objects (for example Java Script objects), preferably before they are output in the output print data stream, are kept ready by an application interface to be read out, to be changed, to be deleted or to have new objects appended.

According to the prior art, hitherto the page descriptions necessary for the storage of forms in the output devices had to be created laboriously by hand, that is to say programmed in the respective page description language—time-consuming and expensive work which can be carried out only by a few programmers qualified to do this. The same also applies to changes in the stored data.

The object-oriented intermediate format now makes it possible for the stored graphically representable objects to be kept ready to be read out, to be changed, to be deleted or for new objects to be appended, in a technically elegant manner via an application interface, by assigning the methods required for this to the respective objects in accordance with their class hierarchy. This means that the objects stored in the memory can, for example, be displayed on a screen and modified as desired. Here, too, deleting existing objects and appending new objects are also possible.

By means of binding suitable application software—also called FormMaker—it is therefore made possible in particular for each EDP user to modify existing forms and to create new forms entirely without any programming knowledge, which likewise applies to scripts.

Given suitable selection of the application interface and processing methods correspondingly available to a sufficient extent for the object classes used, a graphic core system with a functional interface is thus made available, which can be used by applications for graphic user interfaces, such as those based on the Windows operating system, to display the object data as a standard document on the screen and to modify it with different processing tools.

The application interface also preferably permits script objects, preferably Java Script objects themselves, to be read out graphically, to be changed, to be deleted or to be appended, these graphically performed manipulations being automatically transformed, if required, into script objects, preferably Java Script objects. It thus provides a complete graphic development environment for computers, preferably computers operating under the Windows operating system, which permits the printing and copying systems to be programmed without Java Script knowledge.

In addition, already existing development tools which are based on Java can likewise be used for the development of individual JScribe (registered trademark) applications.

The use of "FormMaker" application software permits the design of "intelligent" electronic forms, which are transformed into logical documents with the aid of JScribe (registered trademark). These in turn can be made available in systems connected to the network and output at any desired location by any desired printing systems, preferably laser printing systems and digital copying systems, sent as e-mail or else transferred to archiving systems.

The present method according to the invention can also be present implemented on a system for the transformation of digital print data streams comprising at least one data processing unit having at least one memory and at least one communications interface, the data processing unit being programmed in such a way that it operates in accordance with an embodiment of the method according to the invention.

In this case, the system preferably also has an operating station with display means and input means, which makes it possible for the graphically representable objects stored in the memory of the data processing unit in an object-oriented format, preferably also script objects, to be read out via the application interface, to be changed, to be deleted or to be appended, preferably before they are output in the output print data stream.

In addition, the system according to the invention can moreover permit respectively stored objects, preferably even script objects themselves, such as Java Script objects, to be read out graphically, to be changed, to be deleted or to be appended, these graphically performed manipulations being transformed automatically, if required, into Java Script objects.

The system according to the invention can also be integrated into a printer or else a printer server.

JScribe (registered trademark) can therefore not only be employed directly on printers and digital copying system but can also be implemented on PC server platforms.

For installation purposes on printing systems, the JScribe script sequences can, for example, be incorporated into a Prescribe (registered trademark) data stream. The printing system receiving this data, for example the appropriate laser printer or digital copier, will read in and compile the program code.

This permits the configuration of networks with hardware units which are small but equipped with high functionality, which have a common interface and permit access relating to archiving documents, to distributed printing (cluster printing) and security printing and much more.

The abovedescribed embodiments of the method according to the present invention can of course in each case also be implemented as a computer program product which has a computer-readable medium with computer program code means or as a computer program on an electronic carrier signal and in which, in each case after the computer program has been loaded, the computer is caused by the program to carry out the method according to the invention described here.

In the following text, an exemplary embodiment, not to be understood as restrictive, will be discussed by using the drawing, in which:

FIG. 1 shows the sequence of an embodiment of the method according to the invention using a schematic representation.

FIG. 1 shows the sequence of an embodiment of the method according to the invention using a schematic representation. From a computer 1, an input print data stream 2 is sent to a device 3—for example a computer such as a PC or else an intelligent output device such as an intelligent printer—which operates in accordance with the method according to the present invention. There, the input print data stream 2 is analyzed and split up by a parser 4. The graphic objects 5, 5a recognized as the product of this splitting are stored in a memory 6 in an object-oriented format; this is after they have possibly been combined to form super-objects. The objects 5 stored in the memory 6, preferably script objects 5a, are kept ready to be read out via an application interface 7, to be changed, to be deleted or for new objects to be appended. In this way, the objects 5, 5a stored in the memory 6 can, for example, be displayed on a screen 9 and modified as desired. Deleting existing objects and appending new objects is also possible here. If suitable application software is used, it is thus possible for any user to modify existing forms easily and without programming knowledge or to create new forms easily and without programming knowledge or to create new forms. The graphically representable objects 5, 5a stored in the memory 6 in an object-oriented format are transformed into a format for the control of an output device, preferably a printer 9, in order to be output, and the objects 5, 5a thus transformed are combined into an output print data stream 10 and output. Feedback messages 11 concerning the output print data stream 10 output are read in and analyzed for error messages which indicate that the printer 10 has detected a graphic object 5, 5a in the output print data stream 10 which cannot be output or processed by said printer. This graphic object 5, 5a is then split up into part objects of lower complexity, and the part objects obtained in this way, in the format for the control of the printer 9, are slipped into the output print data stream 10 which is output to the printer 9.

What is claimed is:

1. A method for the transformation of digital print data streams, in which
   (i) an input print data stream (2) is read in,
   (ii) this is analyzed by means of a parser (4) for graphically representable objects (5) and is split up into these graphically representable objects (5), and
   (iii) the graphically representable objects (5) are stored in a memory (6) in an object-oriented format, and
   (iv) the graphically representable objects (5) stored in the memory (6) in an object-oriented format are transformed into a format for the control of an output device (9), preferably a printer, and
   (v) the objects thus transformed are combined into an output print data stream (10) and are output,
characterized in that graphically representable objects (5, 5a) are stored in the memory (6) in an object-oriented format, to which at least one stored script is assigned, which is executed in the cases defined in the script.

2. The method as claimed in claim 1, characterized in that the graphically representable objects (5, 5a) are combined into super-objects of higher complexity before being stored in the memory (6).

3. The method as claimed in claim 1, characterized in that feedback messages (11) referring to the output print data stream (10) output are read in and are analyzed for error messages which indicate that the output device (9), preferably the printer, has recognized a transformed graphic object in the output print data stream (10) which cannot be output by said printer, this graphic object is then split up into part objects of lower complexity, and the part objects thus obtained, in the format for the control of the output device (9), are slipped into the output print data stream (10) which is output to the output device (9).

4. The method as claimed in claim 1, characterized in that at least one graphically representable object (5) stored in the memory (6) in the object-oriented format is assigned at least one script (5a) which controls external devices, preferably archiving devices, folding systems, enveloping systems or security equipment.

5. The method as claimed in claim 1, characterized in that at least one graphically representable object (5) stored in the memory (6) in the object-oriented format is assigned at least one script (5a) which automatically receives data, preferably data organized in an object-oriented manner, image data, text data or data from web pages from the Internet, data from XML documents or else e-mails.

6. The method as claimed in claim 5, characterized in that the script (5a) automatically receiving data also requests this data automatically.

7. The method as claimed in claim 5, characterized in that the script (5a) in turn reassigns the data received by it to the graphic object (5) associated with itself, and prints out the graphic object (5) assigned to itself together with the data requested, received and reassigned by itself.

8. The method as claimed in claim 1, characterized in that at least one graphically representable object (5) stored in the memory (6) in the object-oriented format is assigned at least one script (5a) which automatically sends data, preferably data organized in an object-oriented manner, image data, text data or data from web pages from the Internet, data from XML documents or else e-mails.

9. The method as claimed in claim 8, characterized in that the script (5a) sends the graphic object (5) associated with itself to receiver.

10. The method as claimed in claim 9, characterized in that the script (5a) in turn reassigns the data received by it to the graphic object (5) associated with it, and prints out the graphic object (5) assigned to itself together with the data requested, received and reassigned by itself.

11. The method as claimed in claim 1, characterized in that at least one graphically representable object (5) stored in the memory (6) in the object-oriented format is assigned at least one script (5a) which is executed in the case of the output of the object (5) defined in the script (5a).

12. The method as claimed in claim 1, characterized in that at least one graphically representable object (5) stored in the memory (6) in the object-oriented format is assigned at least one script (5a), at least one case relating to the execution of the script (5a) being defined in the respective script (5a), and occurring automatically, preferably without further influence from outside.

13. The method as claimed in claim 12, characterized in that the automatically occurring case, defined at least in the respective script (5a), relating to the execution of the script (5a) is configured as a timer, that is to say as a case which occurs automatically as a result of expiry of time.

14. The method as claimed in claim 13, characterized in that the timer operates cyclically, that is to say it starts itself again upon expiry.

15. The method as claimed in claim 1, characterized in that Java Script is used as a formal language for the scripts.

16. The method as claimed in claim 1, characterized in that the graphically representable objects (5) stored in the memory (6) in an object-oriented format, preferably also script objects (5a), preferably before they are output in the output print data stream (10), are kept ready by an application interface (7) to be read out, to be changed, to be deleted or to have new objects (5) appended.

17. A system for the transformation of digital print data streams comprising at least one data processing unit having at least one memory and at least one communications interface, characterized in that the data processing unit is programmed in such a way that it operates in accordance with the method as claimed claim 1.

18. The system for the transformation of digital print data streams as claimed in claim 17, the system also has an operating station with display means (8) and input means, which makes it possible for the graphically representable objects (5) stored in the memory (6) of the data processing unit in an object-oriented format, preferably also script objects (5a), to be read out via the application interface (7), to be changed, to be deleted or to be appended, preferably before they are output in the output print data stream (10).

19. The system for the transformation of digital print data streams as claimed in claim 17, wherein the data processing unit, permits respectively stored objects, preferably also Java Script objects (5a) themselves, to be read out graphically, to be changed, to be deleted or to be appended, these graphically performed manipulations if necessary being transformed automatically into Java Script objects (5a).

20. A printer, characterized in that it has a system for the transformation of digital print data streams as claimed in claim 17.

21. A printer server, characterized in that it has a system for the transformation of digital print data streams as claimed in claim 17.

22. A computer-readable medium having stored thereon instructions to cause a processor to execute a method, the method comprising:
   (i) an input print data stream (2) is read in,
   (ii) this is analyzed by means of a parser (4) for graphically representable objects (5) and is split up into these graphically representable objects (5), and
   (iii) the graphically representable objects (5) are stored in a memory (6) in an object-oriented format,
   (iv) the graphically representable objects (5) stored in the memory (6) in an object-oriented format are transformed into a format for the control of an output device (9), preferably a printer, and
   (v) the objects thus transformed are combined into an output print data stream (10) and are output,
   characterized in that graphically representable objects (5, 5a) are stored in the memory (6) in an object-oriented format, to which at least one stored script is assigned, which is executed in the cases defined in the script.

23. The computer-readable medium as claimed in claim 22, the method characterized in that the graphically representable objects (5, 5a) are combined into super-objects of higher complexity before being stored in the memory (6).

24. The computer-readable medium as claimed in claim 22, the method characterized in that feedback messages (11) referring to the output print data stream (10) output are read in and are analyzed for error messages which indicate that the output device (9), preferably the printer, has recognized a transformed graphic object in the output print data stream (10) which cannot be output by said printer, this graphic object is then split up into part objects of lower complexity, and the part objects thus obtained, in the format for the control of the output device (9), are slipped into the output print data stream (10) which is output to the output device (9).

25. The computer-readable medium as claimed in claim 22, the method characterized in that at least one graphically representable object (5) stored in the memory (6) in the object-oriented format is assigned at least one script (5a) which controls external devices, preferably archiving devices, folding systems, enveloping systems or security equipment.

26. The computer-readable medium as claimed in claim 22, the method characterized in that at least one graphically representable object (5) stored in the memory (6) in the object-oriented format is assigned at least one script (5a) which automatically receives data, preferably data organized in an object-oriented manner, image data, text data or data from web pages from the Internet, data from XML documents or else e-mails.

27. The computer-readable medium as claimed in claim 26, the method characterized in that the script (5a) automatically receiving data also requests this data automatically.

28. The computer-readable medium as claimed in claim 26, the method characterized in that the script (5a) in turn reassigns the data received by it to the graphic object (5) associated with itself, and prints out the graphic object (5) assigned to itself together with the data requested, received and reassigend by itself.

29. The computer-readable medium as claimed in claim 22, the method characterized in that at least one graphically representable object (5) stored in the memory (6) in the object-oriented format is assigned at least one script (5a) which automatically sends data, preferably data organized in an object-oriented manner, image data, text data or data from web pages from the Internet, data from XML documents or else e-mails.

30. The computer-readable medium as claimed in claim 29, the method characterized in that the script (5a) sends the graphic object (5) associated with itself to a receiver.

31. The computer-readable medium as claimed in claim 30, the method characterized in that the script (5a) in turn reassigns the data received by it to the graphic object (5) associated with it, and forwards the graphic object (5) associated with itself to a receiver together with the data requested, received and reassigned by itself.

32. The computer-readable medium as claimed in claim 22, the method characterized in that at least one graphically representable object (5) stored in the memory (6) in the object-oriented format is assigned at least one script (5a) which is executed in the case of the output of the object (5) defined in the script (5a).

33. The computer-readable medium as claimed in claim 22, the method characterized in that at least one graphically representable object (5) stored in the memory (6) in the object-oriented format is assigned at least one script (5a), at least one case relating to the execution of the script (5a) being defined in the respective script (5a), and occurring automatically, preferably without further influence from outside.

34. The computer-readable medium as claimed in claim 33, the method characterized in that the automatically occurring case, defined at least in the respective script (5a), relating to the execution of the script (5a) is configured as a timer, that is to say as a case which occurs automatically as a result of expiry of time.

35. The computer-readable medium as claimed in claim 34, the method characterized in that the timer operates cyclically, that is to say it starts itself again upon expiry.

36. The computer-readable medium as claimed in claim 22, the method characterized in that Java Script is used as a formal language for the scripts.

37. The computer-readable medium as claimed in claim 22, the method characterized in that the graphically representable objects (5) stored in the memory (6) in an object-oriented format, preferably also script objects (5a), preferably before they are output in the output print data stream (10), are kept ready by an application interface (7) to be read out, to be changed, to be deleted or to have new objects (5) appended.

38. A computer data signal embodied in a carrier wave and representing sequences of instructions which, when executed by a processor, cause the processor to perform a method, the method comprising:

(i) an input print data stream (2) is read in, (ii) this is analyzed by means of a parser (4) for graphically representable objects (5) and is split up into these graphically representable objects (5), and (iii) the graphically representable objects (5) are stored in a memory (6) in an object-oriented format, (iv) the graphically representable objects (5) stored in the memory (6) in an object-oriented format are transformed into a format for the control of an output device (9), preferably a printer, and (v) the objects thus transformed are combined into an output print data stream (10) and are output, characterized in that graphically representable objects (5, 5a) are stored in the memory (6) in an object-oriented format, to which at least one stored script is assigned, which is executed in the cases defined in the script.

39. The computer data signal as claimed in claim 38, the method characterized in that the graphically representable objects (5, 5a) are combined into super-objects of higher complexity before being stored in the memory (6).

40. The computer data signal as claimed in claim 38, the method characterized in that feedback messages (11) referring to the output print data stream (10) output are read in and are analyzed for error messages which indicate that the output device (9), preferably the printer, has recognized a transformed graphic object in the output print data stream (10) which cannot be output by said printer, this graphic object is then split up into part objects of lower complexity, and the part objects thus obtained, in the format for the control of the output device (9), are slipped into the output print data stream (10) which is output to the output device (9).

41. The computer data signal as claimed in claim 38, the method characterized in that at least one graphically representable object (5) stored in the memory (6) in the object-oriented format is assigned at least one script (5a) which controls external devices, preferably archiving devices, folding systems, enveloping systems or security equipment.

42. The computer data signal as claimed in claim 38, the method characterized in that at least one graphically representable object (5) stored in the memory (6) in the object-oriented format is assigned at least one script (5a) which automatically receives data, preferably data organized in an object-oriented manner, image data, text data or data from web pages from the Internet, data from XML documents or else e-mails.

43. The computer data signal as claimed in claim 42, the method characterized in that the script (5a) automatically receiving data also requests this data automatically.

44. The computer data signal as claimed in claim 42, the method characterized in that the script (5a) in turn reassigns the data received by it to the graphic object (5) associated with itself, and prints out the graphic object (5) assigned to itself together with the data requested, received and reassigned by itself.

45. The computer data signal as claimed in claim 38, the method characterized in that at least one graphically representable object (5) stored in the memory (6) in the object-oriented format is assigned at least one script (5a) which automatically sends data, preferably data organized in an object-oriented manner, image data, text data or data from web pages from the Internet, data from XML documents or else e-mails.

46. The computer data signal as claimed in claim 45, the method characterized in that the script (5a) sends the graphic object (5) associated with itself to a receiver.

47. The computer data signal as claimed in claim 46, the method characterized in that the script (5a) in turn reassigns the data received by it to the graphic object (5) associated with it, and forwards the graphic object (5) associated with itself to a receiver together with the data requested, received and reassigned by itself.

48. The computer data signal as claimed in claim 38, the method characterized in that at least one graphically representable object (5) stored in the memory (6) in the object-oriented format is assigned at least one script (5a) which is executed in the case of the output of the object (5) defined in the script (5a).

49. The computer data signal as claimed in claim 38, the method characterized in that at least one graphically representable object (5) stored in the memory (6) in the object-oriented format is assigned at least one script (5a), at least one case relating to the execution of the script (5a) being defined in the respective script (5a), and occurring automatically, preferably without further influence from outside.

50. The computer data signal as claimed in claim 49, the method characterized in that the automatically occurring case, defined at least in the respective script (5a), relating to the execution of the script (5a) is configured as a timer, that is to say as a case which occurs automatically as a result of expiry of time.

51. The computer data signal as claimed in claim 50, the method characterized in that the timer operates cyclically, that is to say it starts itself again upon expiry.

52. The computer data signal as claimed in claim 38, the method characterized in that Java Script is used as a formal language for the scripts.

53. The computer data signal as claimed in claim 38, the method characterized in that the graphically representable objects (5) stored in the memory (6) in an object-oriented format, preferably also script objects (5a), preferably before they are output in the output print data stream (10), are kept ready by an application interface (7) to be read out, to be changed, to be deleted or to have new objects (5) appended.

* * * * *